United States Patent [19]

Nickel et al.

[11] 4,333,874

[45] Jun. 8, 1982

[54] CATIONIC TRIAZINYLAMINO AZO DYESTUFFS

[75] Inventors: Horst Nickel, Leverkusen; Friedhelm Müller, Odenthal; Peter Mummenhoff, Cologne, all of Fed. Rep. of Germany

[73] Assignee: Bayer Aktiengesellschaft, Leverkusen, Fed. Rep. of Germany

[21] Appl. No.: 172,506

[22] Filed: Jul. 28, 1980

[30] Foreign Application Priority Data

Aug. 16, 1979 [DE] Fed. Rep. of Germany ....... 2933031

[51] Int. Cl.³ ..................... C07C 107/06; C09B 44/02; C09B 62/085
[52] U.S. Cl. .................................. 260/153; 260/152; 260/156; 260/205; 260/206; 260/207; 260/207.1
[58] Field of Search ......................................... 260/153

[56] References Cited

U.S. PATENT DOCUMENTS

| | | | |
|---|---|---|---|
| 2,955,108 | 10/1960 | Omietanski | 260/205 |
| 3,416,875 | 12/1968 | Ponzini et al. | 260/153 X |
| 3,935,182 | 1/1976 | Jefferies et al. | 260/160 X |

FOREIGN PATENT DOCUMENTS

| | | | |
|---|---|---|---|
| 47-15476 | 5/1972 | Japan | 260/153 |
| 55-36208 | 3/1980 | Japan | 260/153 |

*Primary Examiner*—Charles F. Warren
*Attorney, Agent, or Firm*—Sprung, Horn, Kramer & Woods

[57] ABSTRACT

Cationic azo dyestuffs of the general formula

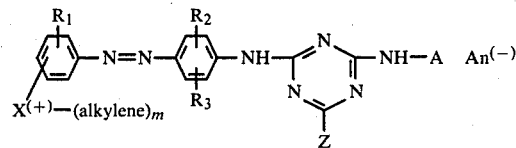

wherein
$X^{(+)}$ denotes an ammonium group,
m denotes 0 or 1,
$R_1$ denotes hydrogen, $C_1$- to $C_4$-alkyl, $C_1$- to $C_4$-alkoxy or halogen,
$R_2$ and $R_3$ independently of one another denote hydrogen, $C_1$-$C_4$-alkyl, $C_1$- to $C_4$-alkoxy or acylamino,
Z denotes halogen or a radical of the formula

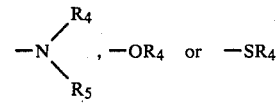

$R_4$ and $R_5$ independently of one another denote hydrogen, or $C_1$- to $C_4$-alkyl, cyclohexyl, phenyl, benzyl or phenylethyl, it being possible for these radicals to be substituted by hydroxyl, $C_1$- to $C_4$-alkoxy, chlorine or cyano and for the cyclohexyl, phenyl, benzyl and phenylethyl radical additionally to be substituted by $C_1$- to $C_4$-alkyl, or
$R_4$ and $R_5$, together with the nitrogen atom to which they are bonded, denote a 5- or 6-membered ring,
A denotes an aryl radical and
$An^{(-)}$ denotes an anion,
are suitable for dyeing synthetic and natural materials.

4 Claims, No Drawings

CATIONIC TRIAZINYLAMINO AZO DYESTUFFS

The invention relates to cationic azo dyestuffs of the formula

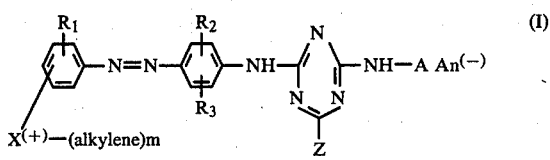

wherein
$X^{(+)}$ denotes an ammonium group,
m denotes 0 or 1,
$R_1$ denotes hydrogen, $C_1$- to $C_4$-alkyl, $C_1$- to $C_4$-alkoxy or halogen,
$R_2$ and $R_3$ independently of one another denote hydrogen, $C_1$- to $C_4$-alkyl, $C_1$- to $C_4$-alkoxy or acylamino,
Z denotes halogen or a radical of the formula

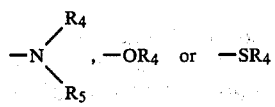

$R_4$ and $R_5$ independently of one another denote hydrogen, or $C_1$- to $C_4$-alkyl, cyclohexyl, phenyl, benzyl or phenylethyl, it being possible for these radicals to be substituted by hydroxyl, $C_1$- to $C_4$-alkoxy, chlorine or cyano and for the cyclohexyl, phenyl, benzyl and phenylethyl radical additionally to be substituted by $C_1$- to $C_4$-alkyl, or
$R_4$ and $R_5$, together with the nitrogen atom to which they are bonded, denote a 5- or 6-membered ring,
A denotes an aryl radical and
$An^{(-)}$ denotes an anion, By the ammonium group $X^{(+)}$ there is understood, in particular, a group of the formula

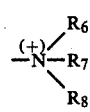

wherein
$R_6$, $R_7$ and $R_8$ independently of one another denote hydrogen, or $C_1$- to $C_4$-alkyl, $C_3$- or $C_4$-alkenyl, benzyl or phenylethyl, it being possible for these radicals to be substituted by hydroxyl, $C_1$- to $C_4$-alkoxy, halogen or cyano and for the benzyl and phenylethyl radicals additionally to be substituted by $C_1$- to $C_4$-alkyl, or
$R_6$ and $R_7$, together with the nitrogen atom to which they are bonded, denote a 5- or 6-membered ring.

Alkylene represents, in particular, a radical with 1 to 3 carbon atoms. By acylamino there is preferably understood $C_1$- to $C_3$-alkylcarbonylamino, $C_1$- to $C_3$-alkylsulphonylamino, aminocarbonylamino or benzoylamino, but in particular acetylamino, propionylamino or aminocarbonyl. Halogen preferably represents fluorine, chlorine or bromine; fluorine and chlorine are to be mentioned in particular in the case of Z, and in other cases chlorine and bromine are to be mentioned in particular.

A represents, in particular, an optionally substituted phenyl or naphthyl radical. Examples of possible substituents are $C_1$- to $C_4$-alkyl, $C_1$- to $C_4$-alkoxy, halogen, acylamino, $C_1$- to $C_4$-alkylsulphonyl, phenylsulphonyl or phenylazo, it being possible for the two phenyl radicals in turn to be substituted, for example by $C_1$- to $C_4$-alkyl. A preferably represents a radical of the formula

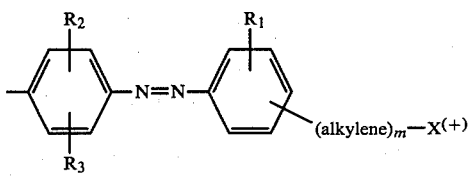

wherein $R_1$, $R_2$, $R_3$, m and $X^{(+)}$ have the meaning indicated for formula (I).

$R_4$ and $R_5$, and $R_6$ and $R_7$, together with the nitrogen atom to which they are bonded, can form, for example, a piperidine or morpholine ring.

Of the dyestuffs of the formula (I), the dyestuffs of the formula

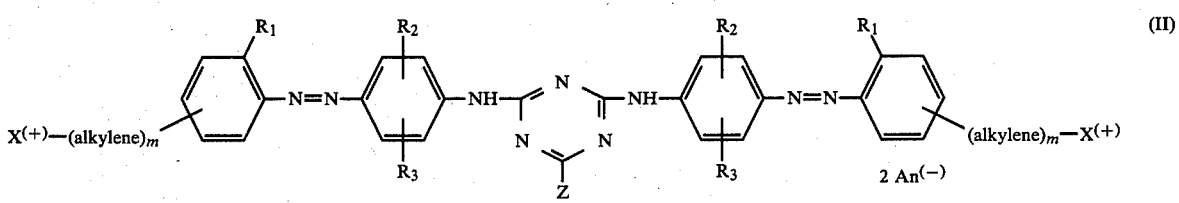

wherein
$R_1$, $R_2$, $R_3$, $X^{(+)}$, Z, $An^{(-)}$ and m have the meaning indicated for formula (I),
and wherein
the triazine ring can be symmetrically or unsymmetrically substituted,
are to be singled out.

Particularly suitable dyestuffs have the formula

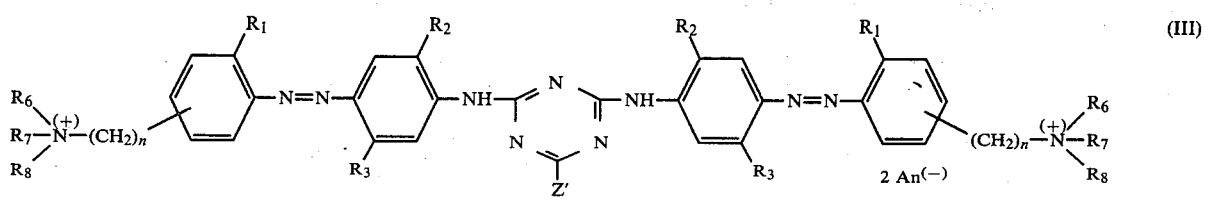

wherein
n represents a number from 0 to 2,
Z' represents

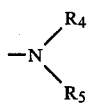

and
R$_1$–R$_8$ and An$^{(-)}$ have the abovementioned meaning.
Of the dyestuffs of the formula (III), those in which
R$_1$ represents hydrogen, methyl, chlorine or methoxy,
R$_2$ and R$_3$ independently of one another represent hydrogen, methyl, methoxy, acetylamino, propionylamino or aminocarbonylamino,
R$_4$–R$_8$ independently of one another represent methyl, ethyl, hydroxyethyl, methoxyethyl, ethoxyethyl, chloroethyl, cyanoethyl, benzyl or allyl and
n represents 0 or 1, in particular 0,
are in turn preferred.

Possible anions An$^{(-)}$ are the customary colourless organic and inorganic anions for cationic dyestuffs, for example chlorine, bromide, iodide, hydroxyl, bisulphate, sulphate, nitrate, dihydrogen phosphate, hydrogen phosphate, phosphate, carbonate, methosulphate, ethosulphate, acetate, propionate, benzenesulphonate and toluenesulphonate.

The anion is in general determined by the preparation process. The dyestuffs are preferably in the form of chlorides, bisulphates, sulphates, methosulphates or acetates. The anions can be replaced by other anions in a known manner.

The invention also relates to the preparation of the dyestuffs (I). This is effected in a known manner, by reaction of aminoazo compounds of the formula

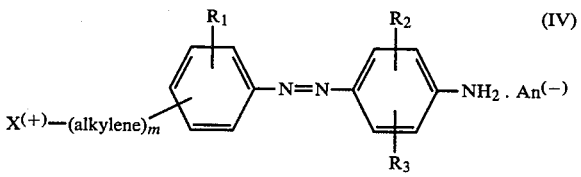

or mixtures thereof, or of the formula

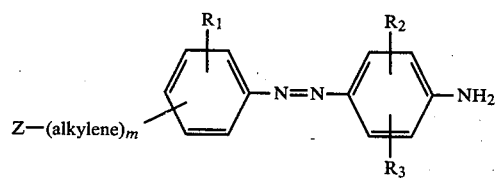

or mixtures thereof, wherein

X$^{(+)}$, m, R$_1$, R$_2$, R$_3$ and An$^{(-)}$ have the meaning indicated for formula (I) and
Z denotes a tertiary amino group,
is first reacted with a symmetric cyanuric halide, preferably cyanuric chloride or fluoride, in a molar ratio of 1:1, the product is then reacted with an amine $$A-NH_2 \quad (VI)$$

in particular with a further amine (IV) or (V), in a molar ratio of 1:1, the third halogen of the triazine ring is reacted, if appropriate, with a compound of the formula

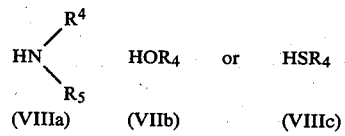

and, in the case of the compound (V), the product is then treated with a quaternising agent. The sequence of the reactions can, of course, be changed.

Examples of suitable amines (VIIa) are: ammonia, methylamine, ethylamine, propylamine (n- and iso) n- and iso-butylamine, tert.-butylamine, cyclo-hexylamine, dimethylamine, diethylamine, di-n- or iso-propylamine, methyl-ethylamine, ethanolamine, diethanolamine, methylethanolamine, 2-methoxyethylamine, 2-ethoxyethylamine, morpholine, benzylamine, N-methylbenzylamine, aniline, N-methylaniline, 2-, 3- or 4-methylaniline, 2-, 3- or 4-methoxyaniline, 2-, 3- or 4-chloroaniline, N-methyl-3- or 4-methylaniline, N-(2-hydroxy-ethyl)-aniline and 1-naphthylamine.

If appropriate, the hydroxy and mercapto compounds (VIIb) and (VIIc) are employed in the form of their alkali metal derivatives. Suitable compounds are, for example: Na hydroxide and K hydroxide, methanol, ethanol, glycol, glycol monomethyl ether and glycol monoethyl ether, diglycol, diglycol monomethyl ether and diglycol monoethyl ether, phenol, 4-hydroxytoluene, benzyl alcohol, Na bisulphite and K bisulphide and thiophenol.

Examples of possible quaternising agents are: halides, such as methyl chloride or bromide, ethyl chloride or bromide, allyl chloride or benzyl chloride, arylsulphonic acid esters, such as benzenesulphonic acid methyl ether or ethyl ester or toluenesulphonic acid methyl ester or ethyl ester, and sulphuric acid esters, such as dimethyl sulphate or diethyl sulphate.

The aminoazo compounds of the formulae (IV) are obtained by coupling diazonium compounds of the amines of the formula

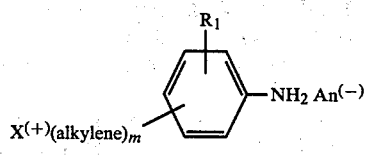 (VIII)

or

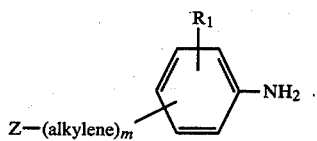 (IX)

with the coupling components of the formula

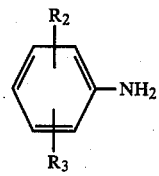 (X)

wherein the symbols have the meaning indicated for the formulae (I) and (IV).

If appropriate, the coupling components must be employed in the form of their N-methanesulphonic acid derivatives.

Examples of suitable amines of the formulae (VIII) and (IX) are:

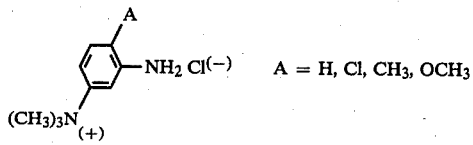

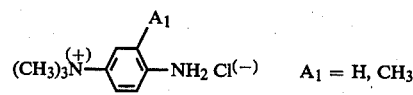

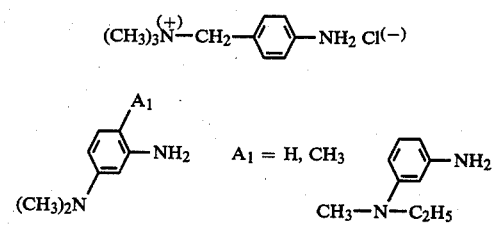

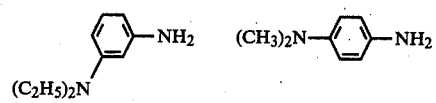

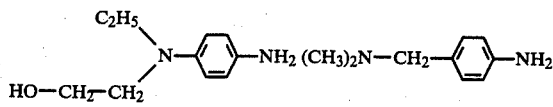

and

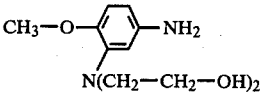

Examples of suitable coupling components (X) (some of which must be employed as N-methanesulfonic acids) are aniline, 2- or 3-aminotoluene, 2-aminoanisole, 3-aminoanisole, 3-amino-4-methoxy-toluene, 2-amino-4-methoxytoluene, 2-ethylaniline, 2-ethoxy-aniline, 3-acetylaminoaniline, 3-propionylamino-aniline and 3-aminophenylurea.

The dyestuffs are used for dyeing materials which can be dyed with cationic dyestuffs. Examples which may be mentioned are: polyacrylonitrile, acid-modified polyesters, for example polyglycol terephthalates, such as are described in Belgian Pat. No. 549,179 or U.S. Pat. No. 2,893,816, acid-modified polyamides, tannin-treated vegetable fibres (cotton), leather and, preferably, paper. The dyestuffs are suitable for dyeing sized and unsized paper, it being possible for bleached or unbleached pulp to be used as the starting material, and for hardwood pulp or softwood pulp, such as birch and/or pine sulphite and/or sulphate pulp, to be used.

The dyestuffs are used either as pulverulent or granular preparations or in the form of concentrated solutions. Pulverulent preparations are formulated in the customary manner and formulating materials, such as sodium sulphate, phosphate, chloride or acetate, in the presence of dust-removing agents.

Concentrated dyestuffs solutions can be of an aqueous or aqueous/organic nature, customary additives which are not harmful to the environment and can be degraded as well as possible being preferred, such as organic acids, preferably acetic acid and formic acid, amides, such as formamide and dimethylformamide, urea, alcohols, such as glycol or diglycol, and diglycol ethers, preferably methyl or ethyl ethers.

The dyestuffs have an excellent affinity and very good general fastness properties. Dyeings on paper are distinguished by very good fastness to wet processing and fastness to alum, acid and alkali. They have a surprisingly good fastness to light, and at the same time a good clarity and depth of colour.

EXAMPLE 1

(1) 18.5 parts (0.1 mol) of cyanuric chloride, dissolved in 200 parts of acetone, are suspended in 300 parts of ice-water. A solution of 33.5 parts (0.1 mol) of the aminoazo compound

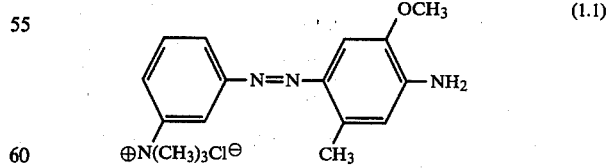 (1.1)

in 1,000 parts of water is added, as the first condensation component, to this suspension at about 5° C. and the mixture is stirred at room temperature until the first condensation reaction has ended, the pH being maintained at 4 to 5 and the acid liberated being neutralised with 20% strength sodium carbonate solution. The reaction product precipitates. A solution of 33.5 parts (0.1 mol) of the above aminoazo compound (1.1) in 1,000 parts of water is then added, as the 2nd condensation component, the mixture is warmed to 50° C., the pH value is kept at 5 by adding 20% strength sodium carbonate solution dropwise and the mixture is stirred until the second condensation reaction has ended. The dyestuff which has precipitated is filtered off and the resulting dyestuff paste is dried in vacuo. A dark powder which dissolves in water giving a yellow-coloured solution is obtained. The dyestuff dyes paper in reddish-tinged yellow shades.

(2) For the 3rd condensation reaction, the above resulting dyestuffs paste is dissolved in 1,700 parts of water at about 50° C., 20 ml of 25% strength ammonia solution are added and the solution is kept at 98°–100° until the reaction of the chlorine of the triazine dyestuff has ended (about one hour). The mixture is then acidified with hydrochloric acid and, after being salted out with sodium chloride, the dyestuff is isolated. The dyestuff paste is dried in vacuo. A dark powder which dissolves in water giving a yellow-coloured solution is obtained. Paper is dyed in reddish-tinged yellow shades. The $\lambda_{max}$ value of the dyestuff is 400 nm.

(3) If, instead of the ammonia (A), 10 parts of 2-aminoethanol (B) are used for the 3rd reaction and the procedure followed is as described under (2), a reddish-tinged yellow dyestuff which dyes paper in reddish-tinged yellow shades which are fast to light and stable to alum, is likewise obtained. The dyestuff has a $\lambda_{max}$ value of 418 nm.

Similar dyestuffs are obtained if the condensation reaction is carried out with diethanolamine (C) or methyl-ethanolamine (D), ethyl- or propanol-amine (E), diisoproanolamine (F), N-(β-hydroxyethyl)-aniline (G) or 2-methylaniline (H).

(4) If a solution of 30 parts (0.1 mol) of the aminoazo compound of the formula

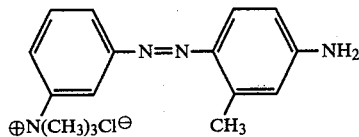

(1.2)

(prepared by coupling diazotised 3-aminobenzene-trimethylammonium chloride with 3-aminotoluene) in 1,000 parts of water is added to the above product (1.1) obtained in the first condensation reaction with cyanuric chloride, and a condensation reaction is carried out as described above, at 50° C., a dyestuff is obtained, after isolation and drying, which dissolves in water giving a yellow-coloured solution and dyes paper in yellow shades.

(5) If the dyestuff described under (4) is subjected to a condensation reaction with ammonia as described above (2), a yellow dyestuff which dyes paper in yellow shade is obtained.

(6) If the 3rd condensation of the dyestuff described under (4) is carried out with 2-aminoethanol, diethanolamine, methylethanolamine or diisopropanolamine, dyestuffs which dye paper in yellow shades are obtained.

(7) If the product (1.1) of the first condensation reaction with cyanuric chloride is subjected to a condensation reaction, in the second stage, with a solution of 6.1 parts (0.1 mol) of ethanolamine in 50 parts of water at 40°–50° and the product is then subjected to a condensation reaction, in the third stage, with a solution of 0.1 mol of the aminoazo compound (1.1) at 95°–100°, a dyestuff is obtained, after acidification and salting out, which is identical to that described under (3), using ethanolamine, and dyes paper in reddish-tinged yellow shades.

Further dyestuffs which are synthesised in an analogous manner to that described in the above Example 1 are listed in the following table. Columns 1 to 3 give the condensation components 1, 2 and 3, and column 4 gives the colour shade of a dyeing on paper. (For the abbreviations, see Example (3) above).

| 1 | 2 | 3 | 4 |
|---|---|---|---|
| ⌬—N=N—⌬—NH₂  ⊕N(CH₃)₃ Cl⊖ (1.3) | 1.3 | — | greenish-tinged yellow |
| " | " | A | greenish-tinged yellow |
| " | " | B | greenish-tinged yellow |
| " | " | C | greenish-tinged yellow |
| " | " | D | greenish-tinged yellow |
| " | " | F | greenish-tinged yellow |
| " | 1.2 | A | greenish-tinged yellow |
| " | " | B | greenish-tinged yellow |
| " | 1.1 | B | yellow |
| " | " | C | " |
| " | " | D | " |
| ⌬—N=N—⌬(OCH₃)—NH₂  ⊕N(CH₃)₃ Cl⊖ (1.4) | 1.4 | — | " |
| " | " | A | " |
| " | " | B | " |
| " | " | C | " |
| " | " | D | " |
| " | 1.2 | B | greenish-tinged yellow |
| " | " | C | greenish-tinged yellow |
| " | 1.3 | B | greenish-tinged yellow |
| " | " | D | greenish-tinged yellow |
| " | 1.1 | B | yellow |
| " | " | C | " |
| " | " | D | " |
| " | 1.4 | G | " |
| " | " | H | " |
| " | B | 1.4 | " |
| " | C | " | " |
| " | D | " | " |
| " | G | " | " |
| 1.2 | 1.2 | — | " |
| " | " | A | " |
| " | " | B | " |
| " | " | C | " |
| " | " | D | " |
| " | " | G | " |

| 1 | 2 | 3 | 4 |
|---|---|---|---|
| " | 1.3 | D | greenish-tinged yellow |
| " | " | G | greenish-tinged yellow |
| " | G | 1.3 | greenish-tinged yellow |

EXAMPLE 2

A dry material consisting of 60% of mechanical wood pulp and 40% of unbleached sulphite cellulose is made into a slurry with water in a hollander and is beaten to a SR° of freeness of 40°, such that the solids content is somewhat above 2.5%, and the solids content of the thick pulp is then adjusted to exactly 2.5% with water.

5 parts of a 0.5% strength aqueous solution of the dyestuff of the formula

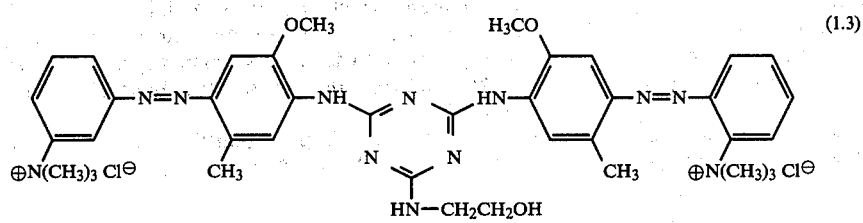
(1.3)

are added to 200 parts of this thick pulp, the mixture is stirred for about 5 minutes, 2% of resin size and 4% of alum (relative to the dry material) are added and the mixture is again stirred for some minutes until it becomes homogeneous. The mass is then diluted with about 500 parts of water and sheets of paper are produced therefrom in the customary manner, by filtration over a sheet-forming machine. The sheets of paper have been dyed a strong reddish-tinged yellow.

We claim:

1. Cationic azo dyestuffs of the general formula

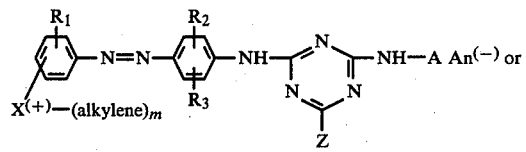

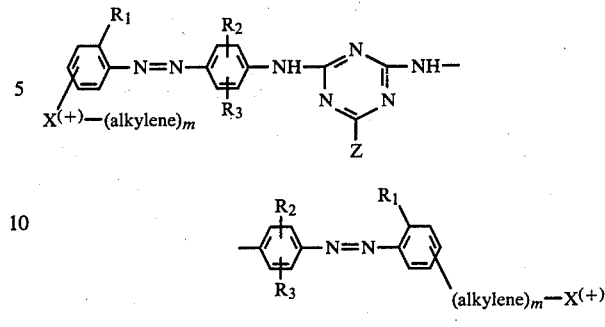

wherein
$X^{(+)}$ denotes an ammonium group,
$m$ denotes 0 or 1,
$R_1$ denotes hydrogen, $C_1$- to $C_4$-alkyl, $C_1$- to $C_4$-alkoxy or halogen,
$R_2$ and $R_3$ independently of one another denote hydrogen, $C_1$- to $C_4$-alkyl, $C_1$- to $C_4$-alkoxy or acylamino,
$Z$ denotes halogen or a radical of the formula

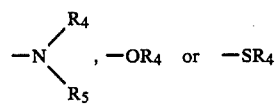

$R_4$ and $R_5$ independently of one another denote hydrogen, or $C_1$- to $C_4$-alkyl, cyclohexyl, phenyl, benzyl or phenylethyl, it being possible for these radicals to be substituted by hydroxyl, $C_1$- to $C_4$-alkoxy, chlorine or cyano and for the cyclohexyl, phenyl, benzyl and phenylethyl radical additionally to be substituted by $C_1$- to $C_4$-alkyl, or
$R_4$ and $R_5$, together with the nitrogen atom to which they are bonded, denote a 5- or 6-membered ring,
A denotes an aryl radical and
$An^{(-)}$ denotes an anion.

2. Cationic azo dyestuffs according to claim 1 of the general formula

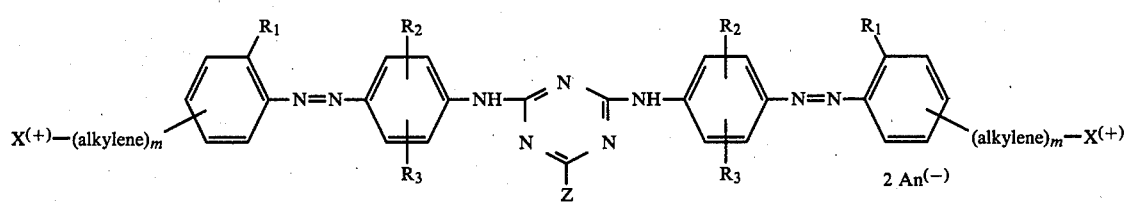

3. Cationic azo dyestuffs according to claim 1 of the general formula

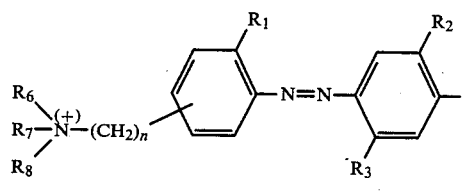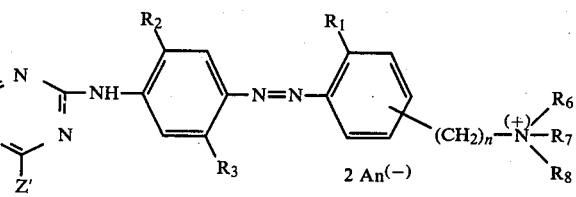

wherein
n denotes a number from 0 to 2,
Z' denotes

R$_4$ and R$_5$ independently of one another denote hydrogen, or C$_1$- to C$_4$-alkyl, cyclohexyl, phenyl, benzyl or phenylethyl, it being possible for these radicals to be substituted by hydroxyl, C$_1$- to C$_4$-alkoxy, chlorine or cyano and for the cyclohexyl, phenyl, benzyl and phenylethyl radical additionally to be substituted by C$_1$- to C$_4$-alkyl, or R$_4$ and R$_5$, together with the nitrogen atom to which they are bonded, denote a piperidine or morpholine ring, and R$_6$, R$_7$ and R$_8$ independently of one another denote hydrogen, or C$_1$- to C$_4$-alkyl, C$_3$- or C$_4$-alkenyl, benzyl or phenylethyl, it being possible for these radicals to be substituted by hydroxyl, C$_1$- to C$_4$-alkoxy, halogen or cyano and for the benzyl and phenylethyl radical. additionally to be substituted by C$_1$- to C$_4$-alkyl, or R$_6$ and R$_7$, together with the nitrogen atom to which they are bonded, denote a piperidine or morpholine ring.

4. Cationic azo dyestuffs of the general formula of claim 3, wherein

R$_1$ represents hydrogen, methyl, chlorine or methoxy,

R$_2$ and R$_3$ independently of one another represent hydrogen, methyl, methoxy, acetylamino, propionylamino or aminocarbonylamino, R$_4$ to R$_8$ independently of one another represent methyl, ethyl, hydroxyethyl, methoxyethyl, ethoxyethyl, chloroethyl, cyanoethyl, benzyl or allyl and n represents 0 or 1, in particular 0.

* * * * *